(12) United States Patent
Katou

(10) Patent No.: US 8,690,357 B2
(45) Date of Patent: Apr. 8, 2014

(54) PROJECTOR HAVING A LIGHT TRANSMITTING WINDOW MOVABLY DISPOSED IN-FRONT OF THE ZOOM LENS AND A CONTROL METHOD FOR THE SAME

(75) Inventor: Atsushi Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 236 days.

(21) Appl. No.: 12/998,467

(22) PCT Filed: Oct. 31, 2008

(86) PCT No.: PCT/JP2008/069891
§ 371 (c)(1),
(2), (4) Date: Apr. 25, 2011

(87) PCT Pub. No.: WO2010/050047
PCT Pub. Date: May 6, 2010

(65) Prior Publication Data
US 2011/0199587 A1 Aug. 18, 2011

(51) Int. Cl.
*G03B 21/14* (2006.01)
(52) U.S. Cl.
USPC ............ 353/97; 353/30; 353/31; 353/37; 353/38; 353/98; 359/634; 359/636
(58) Field of Classification Search
USPC ......... 353/30, 31, 37, 38, 70, 76, 85, 98, 122; 362/317, 319–321, 324, 327, 335, 341, 362/800; 349/5, 7–9
See application file for complete search history.

(56) References Cited

U.S. PATENT DOCUMENTS

| | | | |
|---|---|---|---|
| 5,825,555 A | 10/1998 | Oono et al. | |
| 5,879,065 A * | 3/1999 | Shirochi et al. | 353/8 |
| 5,978,051 A | 11/1999 | Gohman et al. | |
| 6,111,631 A * | 8/2000 | Funfschilling et al. | 349/172 |
| 6,962,416 B2 * | 11/2005 | Ohara | 353/70 |

(Continued)

FOREIGN PATENT DOCUMENTS

| | | |
|---|---|---|
| JP | 2003-131323 | 5/2003 |
| JP | 2006-227083 | 8/2006 |
| JP | 2006-330379 | 12/2006 |
| JP | 2006-330447 | 12/2006 |

(Continued)

OTHER PUBLICATIONS

European Search Report dated Mar. 22, 2012.

(Continued)

*Primary Examiner* — Georgia Y Epps
*Assistant Examiner* — Sultan Chowdhury
(74) *Attorney, Agent, or Firm* — McGinn IP Law Group, PLLC

(57) ABSTRACT

A safe, highly bright projector is to be implemented. A projector directs a light beam from a light source (101) to an image modulating device (105), and magnifies and projects an image formed at the image modulating device (105) through a zoom lens (102). This projector has a light transmitting window (103) movably disposed in front of the surface of the light outgoing side of the zoom lens (102) along the optical axis. The projector further has a window position control unit (108) to control the position of the light transmitting window (103) so as not to change the light beam region that appears on the outer surface of the light transmitting window (103) as the focal length of the zoom lens (102) is varied.

9 Claims, 3 Drawing Sheets

(56) References Cited

U.S. PATENT DOCUMENTS

| | | | |
|---|---|---|---|
| 7,309,133 B2 * | 12/2007 | Miyasaka | 353/122 |
| 7,455,411 B2 * | 11/2008 | Sato | 353/122 |
| 8,038,303 B2 * | 10/2011 | Inoue | 353/70 |
| 2003/0147050 A1 | 8/2003 | Nakamura | |
| 2007/0115435 A1 * | 5/2007 | Rosendaal | 353/30 |
| 2008/0158522 A1 | 7/2008 | Seo | |
| 2009/0091730 A1 * | 4/2009 | Tanaka | 355/67 |
| 2009/0122291 A1 | 5/2009 | Moriyoshi | |
| 2009/0147224 A1 * | 6/2009 | Kurozuka et al. | 353/98 |
| 2009/0207384 A1 * | 8/2009 | Honjo et al. | 353/69 |

FOREIGN PATENT DOCUMENTS

| | | |
|---|---|---|
| JP | 2008-058454 | 3/2008 |
| JP | 2008-107528 | 5/2008 |
| WO | WO2006/137548 A1 | 12/2006 |
| WO | WO 2008/056297 A1 | 5/2008 |

OTHER PUBLICATIONS

US Office Action dated Apr. 2, 2013 for co-pending related U.S. Appl. No. 13/138,686.

US Notice of Allowance and Fee(s) Due dated Aug. 9, 2013 for co-pending related U.S. Appl. No. 13/138,686.

* cited by examiner (a)                        (b)

PROJECTOR HAVING A LIGHT TRANSMITTING WINDOW MOVABLY DISPOSED IN-FRONT OF THE ZOOM LENS AND A CONTROL METHOD FOR THE SAME

TECHNICAL FIELD

The present invention relates to a projector adapted for use with a laser light source and a control method for the same.

BACKGROUND ART

For projectors, the research and development of commercial products using a solid light source instead of a discharge lamp are actively conducted, aiming for improved performance and reductions in size and costs. For example, rear-projection TV sets and pocket projectors using an LED light source are commercially available.

For solid light sources for projectors, laser light sources are regarded as promising as well as LEDs. Although everyone recognizes the high potential of laser light sources for a light source, no projectors using a laser light source have yet been commercially available. The reason is that various restrictions are necessary because of the properties of laser beams, not to mention that inexpensive green semiconductor lasers are not yet in actual use.

For example, beam scanning type projectors that use a MEMS scanner to horizontally and vertically scan a laser beam for displaying images can be reduced in size almost beyond imagination, as compared with existing projectors. However, they need to comply with safety standards prescribed in the International Standard IEC 60825 or the like for safety of laser products. In the IEC 60825 classification, the light output of the light source is restricted to be small. Because of this, it is said to be difficult to achieve a brightness that is fully practical for projectors or to achieve a brightness that is equal to that of conventional projectors using a discharge lamp. In addition, because of the risk that laser beams can directly enter the human eye, safe illuminance is specified for individual classes, and the regulations vary depending of the conditions under which the human eye be exposed to laser beams.

On the other hand, a front projection type projector that indirectly scans a laser beam is known. For example, see JP2008-58454A. This is a type that directs a laser beam to a two-dimensional microdisplay such as a liquid crystal light valve or DMD (Digital Mirror device) and magnifies and projects images displayed on the microdisplay using an optical system such as a projector lens.

This type of projector is considered to implement brighter projectors as compared with the beam scanning type of projector.

Now, when a front projection type projector that uses a laser light source is operated, the state which poses the greatest risk is the state when the human eye is closest to the projector lens (projection lens).

In generally, because a microdisplay having a size that is about one inch or below is often used, it can be thought that the size of the light beam that passes through the part located on the emerging end side of a projector lens, i.e., the part with which people come into closest contact, is greater than a diameter of seven millimeters, which is the average size of the pupil of the human eye. Thus, the power of a laser light beam that has a diameter within the range of a diameter of seven millimeters can be considered to be sufficiently safe. Accordingly, the AEL (Accessible Emission Limit) that is calculated should be set to satisfy the safety class for the projector In projectors using a laser light source, more particularly, in the case of front projection type projectors, a zoom lens is often used to a projector lens for the sake of user convenience and the advantages of the products. For example, in the case where a sufficient projector installation distance to match the screen size is not provided, an image area to be projected onto a screen can be matched with the screen size if the zoom magnification of a zoom lens is changed. In this description, the term "wide angle" means a setting state of the focal length f of the zoom lens in which the projection distance to a screen is made to be the shortest length when projecting an image area in a predetermined size, and the term "tele angle" means a setting state of the focal length f of the zoom lens in which the projection distance to the screen is made to be the longest length when projecting an image area in the same size as the image area of the wide angle.

Generally, in the zoom lens of the projector, the position and angle of a light beam passing through the surface of the light outgoing side of lens element are changed in the process of changing from the wide angle to the tele angle. Thus, the region, which is shining on the surface of the light outgoing side of the lens, (the area of the portion through which a laser light beam passes) changes according to zoom lens magnification adjustments. The size of this region is greater at the wide angle and smaller at "the tele angle" (see FIG. 1).

As a result, under the condition in which the laser output of the light source is constant, differences in safety, more specifically, differences in the AEL, occur between the wide angle and the tele angle.

It is the tele angle that is hazardous to the human eye because its laser power density is higher than that at the wide angle. For this reason, when the laser output is designed to meet the AEL or below which satisfies a safety class at the tele angle, the safety class can be compensated for the entire variable power region of the zoom lens. However, as regards these measures, the safety margin potential according to the AEL is not optimized. In other words, although much brighter images can be lowfully projected at the wide angle, the brightness is not increased.

DISCLOSURE OF THE INVENTION

An object of the present invention is to provide a projector and a control method for the same that can solve the problems mentioned above. An example of this object is to implement a projector in which the setting for light output can be performed at the wide angle side of the zoom lens which can aim higher brightness as well as to ensure safety throughout the entire variable power region of the zoom lens. Also, it is an object to make the light output of the projector equal in the entire variable power region of the zoom lens.

The present invention relates to a projector that magnifies and projects a light beam from a light source. In particular, the present invention is to provide a projector in which energy density in the light beam region that appears on the surface of light outgoing side of a zoom lens is at or below a predetermined safety value throughout the entire variable power region of the zoom lens.

A projector according to an aspect of the present invention has a light transmitting window movably disposed in front of the surface of light outgoing side of a zoom lens along the optical axis. Moreover, the projector has a control means for controlling the position of the light transmitting window so that the light beam region which appears on the outer surface of the light transmitting window will not be changed as the focal length of the zoom lens is varied.

BRIEF DESCRIPTION OF THE DRAWINGS

FIG. 1 (b) is a diagram at a state of a tele angle setting of a zoom lens illustrative of the size of laser light beam region at the light outgoing surface of the zoom lens of a projector.

BEST MODE FOR CARRYING OUT THE INVENTION

Figure 1:
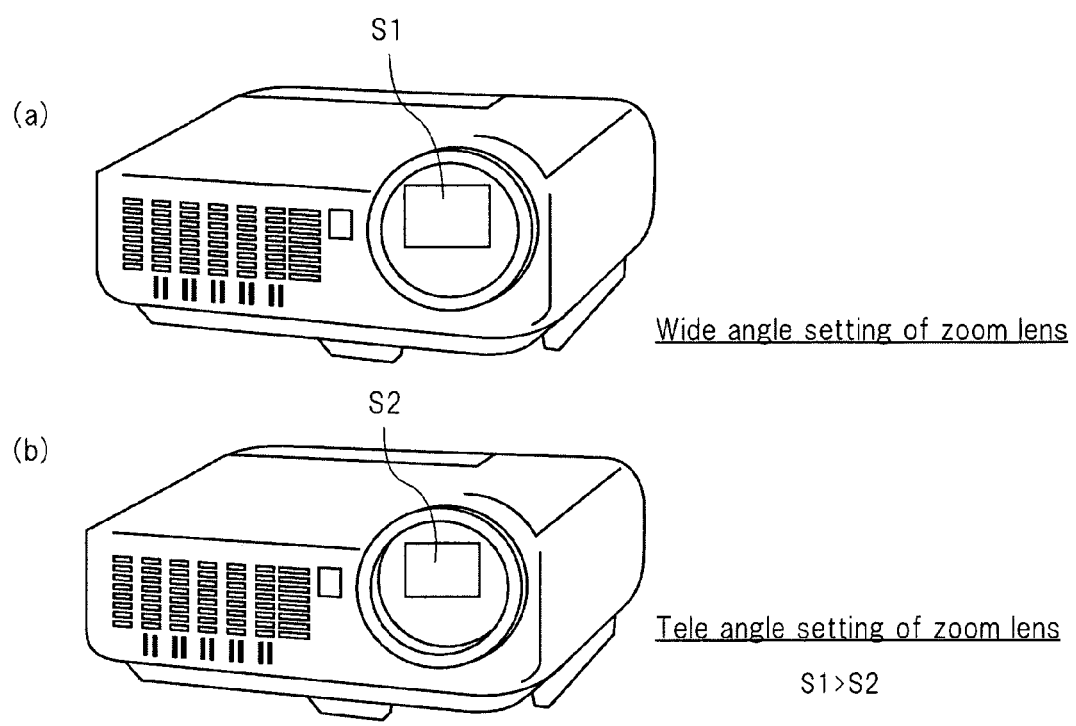
FIG. 1 (a) is a diagram at a state of a wide angle setting of a zoom lens illustrative of the size of laser light beam region at the light outgoing surface of the zoom lens of a projector.

In the following, an embodiment of the present invention will be described with reference to the drawings.

The present invention relates to a projector in which a two-dimensional microdisplay such as a liquid crystal panel or DMD is used for an image modulating device and colored light beams of red (R), green (G), and blue (B) are directed to this image modulating device for magnification and projection through a projector lens. More particularly, the present invention relates to such projectors that have a solid light source such as an LED or a laser light source for a light source and that include a projector lens with a zoom function. In addition, in the following, an example will be given and explained in which a laser light source is used for a projector light source. However, the light source for use therein is not limited thereto, and the light source is replaceable by other light sources that can achieve the object of the present invention.

First, the basic concept of the present invention will be described in detail.

In the case of using a laser for a projector light source as a substitute for an existing discharge lamp, in terms of the competitive strength of products, it is critical that such products can comply with the safety standards for laser beams (IEC 60825, JIS C6802, or the like) and can practicably achieve greater brightness that satisfies the permissible safety classes for projectors. In "High Power Red Semiconductor Lasers and Laser Projector Applications" (Sony Corporation) lecture at the laser technique special seminar held under the sponsorship of the Laser Society of Japan on April 2008, the following concept regarding safety of front projection type projectors using a laser for the light source was discussed.

In the microdisplay scheme, the beam diameter of the laser beam of a light source is magnified to correspond to the size of a microdisplay by using an integrator optical system such as a fly-eye lens, rod lens or the like, and then directed to the microdisplay. The path that the illuminating light follows after the microdisplay is the same as the path in discharge lamp based projectors, so that the light beam that is magnified to correspond to the microdisplay can be regarded as a light source. Thus, if the value of the power density, when the light beam passes though the projector lens, is found to be at or below the AEL (Accessible Emission Limit) value of a predetermined safety class, the projector can be considered to be safe. Moreover, it is specified that the duration of hazardous laser radiation is 0.25 sec or longer.

The most dangerous case for humans regarding laser projectors is the case in which the eye is brought immediately in front of the projector lens, which is the exit point of the projection light of the projector. At this time, the area of the portion of the laser light beam region (the shining portion on the surface of light outgoing side of the projector lens) that appears on the projector lens surface, which is closest to the screen, is sometimes greater than the diameter of the human pupil, a diameter of seven millimeters. In this case, it is necessary for manufacturers to design the laser output of the light source so that the value of the laser power density ($W/mm^2$), which is also referred to as energy density, in the laser light beam region satisfies the requirements for safety classes.

However, in the case of the laser projector having a zoom lens, the size of the laser light beam region (an image area to be projected) that appears on the surface of light outgoing side of the zoom lens is different between the state in which the focal length f of the zoom lens is the longest length (i.e., the tele angle) and the state in which the focal length f of the zoom lens is the shortest length (i.e., the wide angle).

For example, when the zoom lens used for front projection type projectors according to a liquid crystal, DLP (registered trademark) display, or the like is adjusted to the wide angle setting and the tele angle setting, the size of the laser light beam region on the light outgoing surface of the lens element in the zoom lens, which is closest to the screen, is greater at the wide angle than at the tele angle (see FIGS. 1A and 1B).

This is because this is the nature of the zoom lens. Of course, it is all right to consider that in the middle portion between the wide angle and the tele angle, the size of the laser light beam region on the surface of light outgoing side of the lens element becomes smaller as the angle is adjusted from the wide angle to the tele angle.

As described above, in association with adjustment of the focal length of the zoom lens, i.e., the adjustment of zoom magnification, changing the size of the laser light beam region on the surface of light outgoing side of the zoom lens causes laser power density to vary. As a result, safety problems will occur unless manufacturers take some counter measures.

Here, a description will be provided as to why there is a problem when the size of the laser light beam region on the surface of light outgoing side of the lens element is different between the wide angle and the tele angle. In addition, there will also be described the benefit that is to be obtained by compensating for the difference.

The laser light beam region that appears on the surface of light outgoing side of the zoom lens is considered as if a laser light source in that size exists on that surface. As a result, the difference in the size of the laser light beam region means that the laser power density ($W/mm^2$) there is different. Here, among the laser classes specified according to the safety standards for lasers, it is assumed that the predetermined laser safety class is "class 1" for the convenience of explanation.

In designing projectors, the output of the laser light source inside the projector is to be determined in such a way that the energy density that is determined by the size of the laser light beam region on the surface of light outgoing side of the zoom lens is at or below the criteria for class 1, otherwise there will be a lawfully problem. If such a laser is employed whose output is as large as possible within that range, in other words, in the range of class 1, the projected image obtained from the projector finally becomes the brightest within the safety standards.

In order to realize a projector that can project bright images, designers will naturally consider using a laser light source that provides the highest energy density output in the laser light beam region on the surface of light outgoing side of the projector lens with the range of class 1.

However, in this case, a problem arises. In the comparison between the wide angle and the tele angle, the size of the laser light beam region on the surface of light Outgoing side of the zoom lens is greater at the wide angle. For this reason, in light sources having the same laser output, in other words, under the condition in which the laser light source is constantly being used, energy density (laser power density) in the laser light beam region is smaller at the wide angle than at the tele angle.

Thus, supposing that it is desired to satisfy the safety standards for class 1 entirely in the zoom lens magnification varying range, the energy density in the laser light beam region at the tele angle will have to be regulated at or below the safety standards for class 1. Thus, there is a greater margin of safety in the energy density at the wide angle than at the tele angle. In other words, images to be projected at the wide angle lawfully will be considered to become much brighter, but the potential at the wide angle is not optimized.

Such problems arise because the size of the laser light beam region on the surface of light outgoing side of the zoom lens is changed as the focal length of the zoom lens varies. Changing the size of the laser light beam region that appears on the surface of light outgoing side is a natural phenomenon if the position of the surface of light outgoing side of the zoom lens is fixed.

Then, in an example of the present invention, a projection window is movably disposed in front of the surface of light outgoing side of the zoom lens along the optical axis. The projection window is formed of a parallel plate with no refracting power. Then, the energy amount of the laser light beam from the laser light source is set to be constant, and the position of the projection window changes as the focal length of the zoom lens is varied so as not to change the laser light beam region that appears on the outer surface of the projection window when the focal length of the zoom lens varies. For example, the position of the parallel plate of the projection window is in the closest approach at the wide angle setting and is most distant at the tele angle setting with respect to the surface of light outgoing side of the zoom lens.

Based upon this scheme, a projector that features high degree of brightness through the entire range of the zoom lens magnification region can be provided. In addition, such a front projection type laser projector that satisfies a predetermined safety class and that achieves the best performance (brightness) in that class can be brought to market.

EMBODIMENT OF THE PRESENT INVENTION

In the following, an exemplary embodiment of a projector according to the present invention will be described with reference to the drawings.

Figure 2:
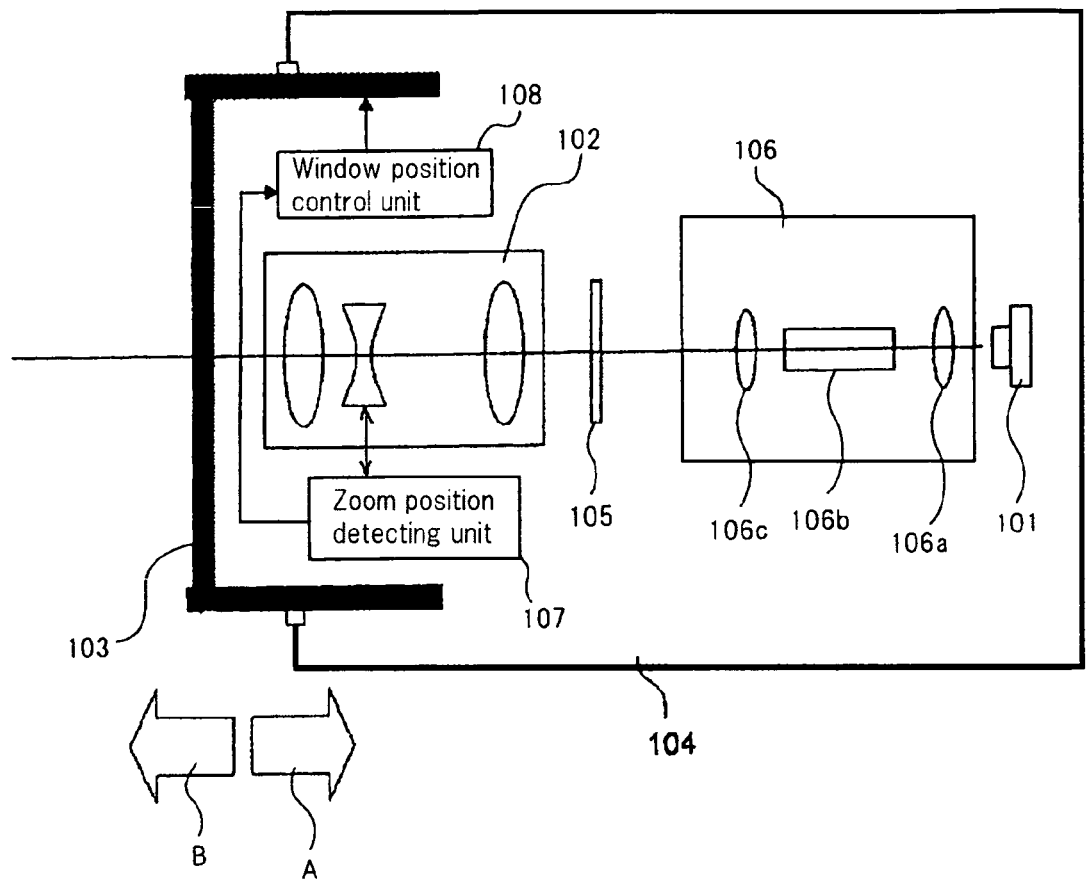
FIG. 2 is a diagram illustrative of the configuration of a first exemplary embodiment of the present invention.

FIG. 2 is a diagram illustrative of the configuration of a first embodiment of the present invention. A projector according to this embodiment includes laser light source 101, image modulating device 105, zoom lens 102, and case 104 that accommodates them.

Case 104 has an opening through which a laser light beam emitted from zoom lens 102 is projected out of the case. This opening is provided with light transmitting window 103 that is movable along the optical axis. For example, light transmitting window 103 is mounted on case 104 at a predetermined spacing with respect to the surface of light outgoing side of zoom lens 102 so that light transmitting window 103 extends out of case 104 or retracts into case 104 through the opening of case 104.

Moreover, light transmitting window 103 is moved while the focal length of zoom lens 102, or the zoom magnification is being varied.

Zoom position detecting unit 107 is provided to detect a zoom position according to varying the focal length of zoom lens 102. Window position control unit 108 is further provided to control the position of light transmitting window 103 according to the detected zoom position. For zoom lens 102, it is possible to use a zoom lens used in projectors of well-known techniques.

The term "zoom position" referred here means the position of a part of an internal lens element group when moving a part of the internal lens element group constituting zoom lens 102 along the optical axis for determining the focal length (the projection distance to the screen, or the zoom magnification) of zoom lens 102.

For an exemplary device that detects the zoom position, a zoom ring is provided on the lens barrel of zoom lens 102 to rotate about the center axis of the lens barrel for changing the zoom position. The zoom ring has a lever exposed on the outer side of case 104 for convenience of users to operate for rotation. A position sensor is provided on zoom lens 102 as zoom position detecting unit 107 to detect the rotation angle of the zoom ring that is a means for changing a zoom position.

If relations between the rotation angle of the zoom ring, the position of a part of the internal lens element group of zoom lens 102, and the focal length (the projection distance to the screen, or the zoom magnification) of zoom lens 102, which is determined according to the position, are found in advance, the current zoom position corresponding to the projection distance to the screen, or to the zoom magnification is found from the rotation angle of the zoom ring, which is detected by the position sensor.

In this case, the rotation range of the zoom ring is limited. In zoom lens 102, rotating the zoom ring to one end of the rotation range creates the state in which the focal length of the zoom lens is the shortest, i.e., "wide angle", whereas rotating the ring to other end creates the state in which the focal length of the zoom lens is the longest, i.e., "tele angle".

The example is shown in which the user operates the lever to rotate the zoom ring. However, it is also possible that the zoom ring is rotated with an actuator such as a motor that is remotely operated from a location apart from the projector. Moreover, regarding the means for changing a zoom position, it is also possible to use another structure different from the above-mentioned zoom ring.

Furthermore, for light transmitting window 103, a parallel plate is preferable, which is made of a transparent material capable of transmitting a visible laser light beam. For this parallel plate, it is possible to use optical glass, plastic, or the like, for example. The thickness of the parallel plate is not specified particularly. Because a dangerous situation may occur in case the light transmitting window breaks, it is possible to provide measures to prevent breakage of the flat plate part of light transmitting window 103 by attaching an optical transparent film or the like. Breakage also includes holes, cracks, or the like in addition to destruction.

Figure 3:
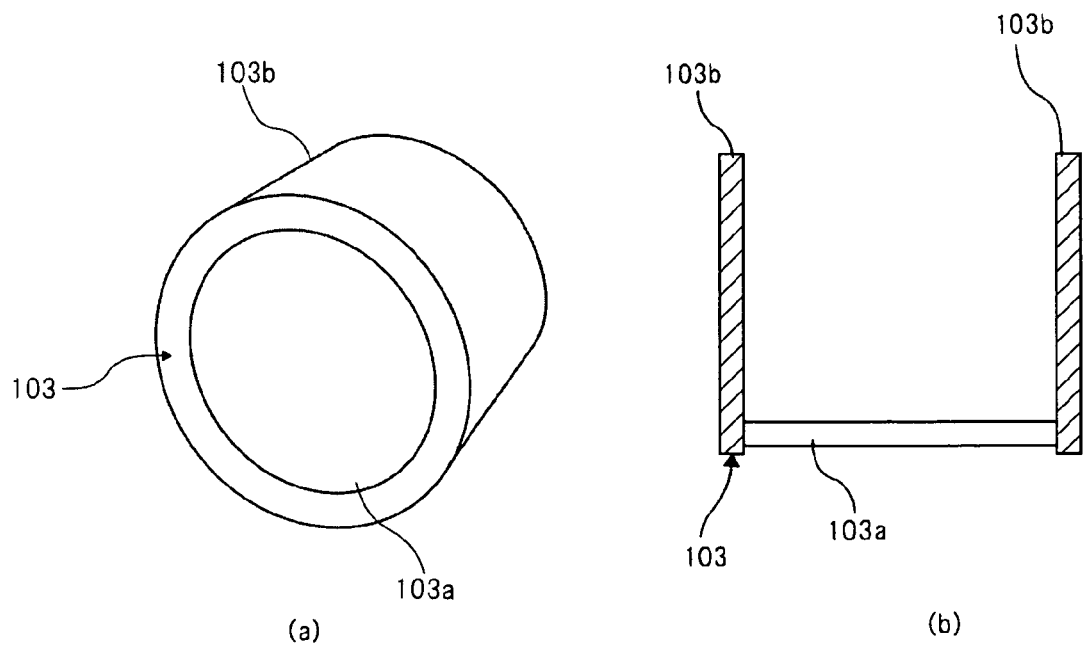
FIG. 3 is an exemplary configuration of a light transmitting window shown in FIG. 2.

As shown in FIG. 3, light transmitting window 103 has its appearance in the shape of a tea canister cap. Flat plate part 103a of light transmitting window 103 is a portion of the parallel plate that is orthogonal to the optical axis and faces the light outgoing surface of zoom lens 102, which is preferably made of a transparent member as discussed above. It is preferable that cylindrical side surface part 103b that surrounds around this flat plate part 103a be made of a non-transparent member. This is because light leaks out of the side surface of light transmitting window 103, or because the human pupil is exposed to danger when brought close to cylindrical side surface part 103b, if cylindrical side surface part 103b is made of a transparent member.

In addition, the form of light transmitting window 103 is not limited to a cylindrical shape. Regarding the form of light transmitting window 103, a prism and other shapes are possible. Desirably, the shape is determined by taking into account the design of case 104. It is important that the light going out of zoom lens 102 is allowed to emerge from light transmitting window 103 without shadowing the light, and that the light is not caused to leak out of the side surface.

For laser light source 101, it is possible to use a semiconductor laser, solid laser, or the like. For laser light sources emitting red or blue light, relatively inexpensive ones are available from already mass-produced semiconductor lasers for DVD or Blu-ray, or the like. Moreover, for green-light emitting lasers, it is possible to use laser light sources obtained by wavelength conversion through SHG (second harmonic generation) devices. However, the present invention is not limited thereto.

Furthermore, between laser light source 101 and image modulating device 105, illuminating optical system 106 is disposed to magnify a laser light beam (laser beam) from laser light source 101 to the size corresponding to the size of image modulating device 105. Illuminating optical system 106 is formed of lens 106a, integrator 106b, and lens 106c in this order along the traveling direction of the laser light beam. Lenses 106a and 106c are a convex lens, and integrator 106b is a fly-eye lens, rod integrator, or the like.

Image modulating device 105 is a microdisplay that forms two-dimensional images, and a transmissive liquid crystal light valve, DMD (the digital mirror device), LCOS (reflective liquid crystal device), or the like is used therefor, for example.

An image formed at two-dimensional image modulating device 105 is projected onto a screen, white wall, or the like, not shown, through zoom lens 102. At this time, the image is permitted to go out of case 104 through light transmitting window 103.

In addition, the block diagram shown in FIG. 2 is illustrated as a schematic diagram. Thus, although the laser light source, the image modulating device, etc. are each shown in single one, the configuration is actually sophisticated.

For example, for the light source, such a laser light source that emits light in three colors, R, G, and B is necessary, if it is desired to implement a projector that can provide color images. In this case, if the light source is formed of three independent color laser modules, optical components such as filters or the like for combining these colors of light are also necessary. Of course, also regarding the image modulating device, the layout of the optical system is also varied depending on which type is used, the transmissive type or reflective type. Thus, the optical system of the projector according to the present invention is not limited to the number and layout of optical components shown in the drawings.

Next, the operation of this projector will be described.

For example, a user uses the lever to rotate the zoom ring of zoom lens 102, and then the position (zoom position) of a part of the internal lens system constituting zoom lens 102 is moved to vary the focal length (the projection distance to the screen, or the zoom magnification) of zoom lens 102.

Light transmitting window 103 is moved while the focal length of zoom lens 102 is being varied in this manner.

Here, the motion of light transmitting window 103 will be described in detail.

Figure 4:
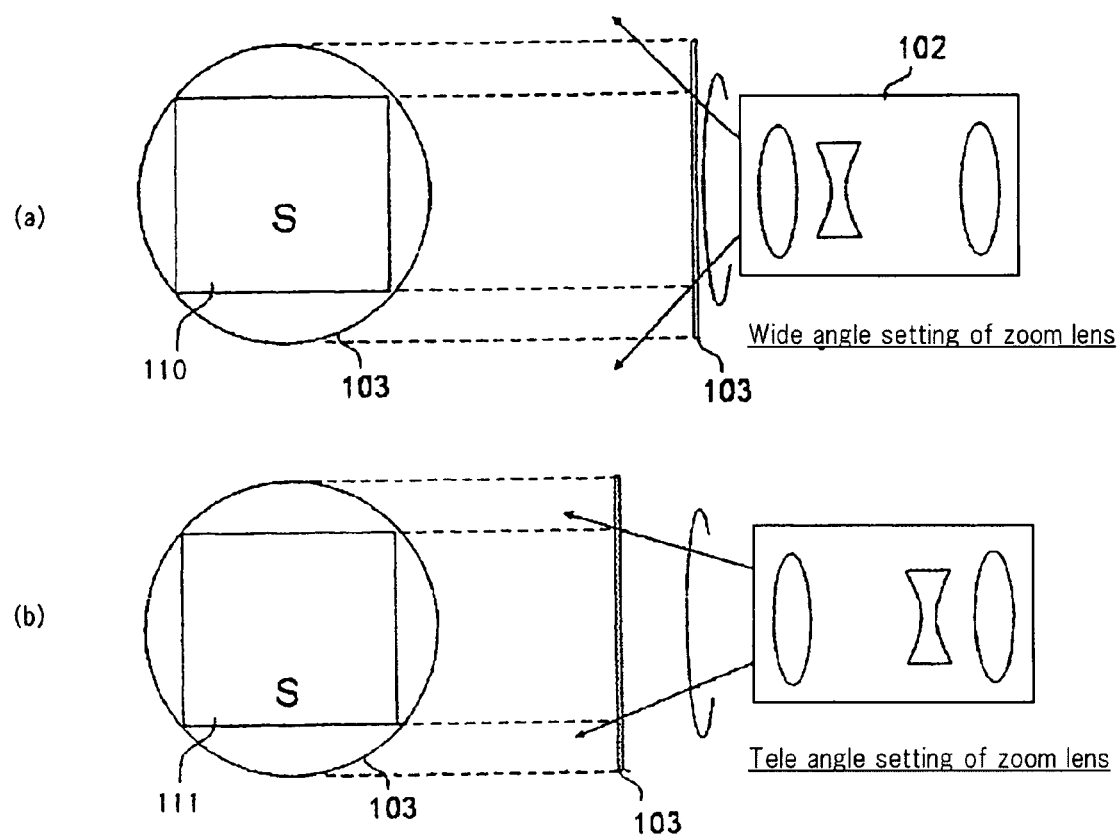
FIG. 4(a) is a diagram at a state of a wide angle setting of a zoom lens illustrative of the size of the laser light beam region on the light transmitting window based on the operation of the window according to the first exemplary embodiment of the present invention.
FIG. 4(b) is a diagram at a state of a tele angle setting of a zoom lens illustrative of the size of the laser light beam region on the light transmitting window based on the operation of the window according to the first exemplary embodiment of the present invention.

Light transmitting window 103 is moved while the focal length of zoom lens 102 is being varied, so that the size of laser light beam region 110 that appears on the outer surface of light transmitting window 103 (flat plate part 103a) when zoom lens 102 is set at the wide angle mode is almost equal to the size of laser light beam region 111 that appears on the outer surface of light transmitting window 103 (flat plate part 103a) when zoom lens 102 is set at the tele angle mode (see FIGS. 4A and 4B). Even in the process of changing between the wide angle and the tele angle, the position of light transmitting window 103 is controlled so as not to change the size of the laser light beam region that appears on the outer surface of light transmitting window 103 (flat plate part 103a).

In the exemplary embodiment, when the user operates the lever provided on the zoom ring of zoom lens 102, zoom position information at this time is detected by zoom position detecting unit 107.

At this time, the position at which light transmitting window 103 is to be moved is found based on the zoom position.

In detail, suppose that light transmitting window 103 is not moved, then the size of the laser light beam region on the outer surface of light transmitting window 103 will become smaller as zoom lens 102 is adjusted from the wide angle to the tele angle. In the present invention, it is desired to control the position of light transmitting window 103 so as not to change the size (area) of the laser light beam region on the outer surface of light transmitting window 103 at any of the zoom positions as the focal length of zoom lens 102 is varied. The size (area) of the laser light beam region that appears on the outer surface of light transmitting window 103 can be accurately known in advance by performing optical simulation (optical path tracking) based on the specification of zoom lens 102. Then, the above-mentioned optical simulation (optical path tracking) is used to calculate in advance the positions of light transmitting window 103, at which the size (area) of the laser light beam region on the outer surface of light transmitting window 103 is not changed for any zoom position, and the positions are stored in window position control unit 108 or the like.

In this case, the size (area) of the laser light beam region on the outer surface of light transmitting window 103 is also determined in advance, so that the output value [W] of laser light source 101 is fixed in such a way that the laser power density (energy density) on light transmitting window 103 is the AEL value [W/mm$^2$], which satisfies the safety class for the projector.

Then, for example, when the lever of the zoom ring is operated to adjust zoom lens 102 at the wide angle, the current zoom position is detected by zoom position detecting unit 107. Based on this detected result, window position control unit 108 moves light transmitting window 103 so as to retract it into case 104 in the direction of arrow A in FIG. 2. At this time, the size (area) of the laser light beam region on the outer surface of light transmitting window 103 is almost the same, which is not increased as compared with the size before the zoom operation to the wide angle.

On the other hand, when zoom lens 106 is set at the wide angle in the initial state and zoom adjustment is performed from that state to the tele angle, zoom position detecting unit 107 detects the current zoom position, and the position at which light transmitting window 103 is to be moved is found from the detected current zoom position information. Based on this detected result, window position control unit 108 moves light transmitting window 103 in the direction of arrow B in FIG. 2 so as to advance it from the inside of case 104. At this time, the size (area) of the laser light beam region on the outer surface of light transmitting window 103 is almost the same, which is not decreased, as compared with the size before the zoom operation to the tele angle.

From the discussion described above, the size of the light beam to emerge from the projector, i.e., the size of the laser light beam region on light transmitting window 103 is always the same, even when the lever of the zoom ring of zoom lens 102 is operated to move the zoom position.

Accordingly, in the present invention, the energy density in the laser light beam region on the outer surface of light transmitting window 103 can be kept at a constant value, which is at or below the AEL value, regardless of varying the focal length of zoom lens 102. In other words, it is possible to provide such a projector that is safe in the entire zoom lens magnification varying region and that projects bright images.

Exemplary Modification of the First Embodiment

The above-mentioned first exemplary embodiment can readily be modified.

For example, it is also possible to construct such a structure that has movable light transmitting window 103 integrally on zoom lens 102, without providing movable light transmitting window 103 at the light outgoing exit of case 104 that has the appearance of the projector like the above-mentioned exemplary embodiment.

More specifically, it may be possible to adopt a lens barrel structure that has an optically transparent parallel plate on the light outgoing side of zoom lens 102. The operation of light transmitting window 103 is almost the same as that of the first embodiment.

Light transmitting window 103 is mounted integrally on zoom lens 102, so that there are merits that the assembly of the overall projector is improved since the moving mechanism of light transmitting window 103 can be designed as the cam mechanism of the lens barrel of the zoom lens.

As discussed above, the exemplary embodiment is shown for the purpose of explaining the invention of the present application. However, the invention of the present application is not limited to the above-mentioned exemplary embodiment. A person skilled in the art can variously modify the forms and details of the invention of the present application, which a person skilled in the art can appreciate, within the scope of the technical idea of the invention of the present application.

The invention claimed is:

1. A projector comprising:
    a zoom lens configured to magnify and project a light beam emitted from a light source;
    a light transmitting window movably disposed in front of a surface of a light outgoing side of said zoom lens along an optical axis; and
    a controller configured to control a position of said light transmitting window so as not to change a region of said light beam that appears on an outer surface of said light transmitting window in accordance with varying a focal length of said zoom lens,
    wherein said light transmitting window is closest to the surface of the light outgoing side of said zoom lens when the focal length of said zoom lens is set to a shortest length, and said light transmitting window is most distant from the surface of the light outgoing side of said zoom lens when the focal length of said zoom lens is set to a longest length.

2. The projector according to claim 1, wherein said light transmitting window is formed of a parallel plate orthogonal to said optical axis and faces the surface of the light outgoing side of said zoom lens.

3. The projector according to claim 1, further comprising a varying mechanism that varies the focal length of said zoom lens.

4. The projector according to claim 3,
    wherein said varying mechanism comprises a zoom ring rotatably mounted on a lens barrel of said zoom lens, the zoom ring being configured to rotate to move a part of an internal lens element group along the optical axis for determining the focal length of said zoom lens, and
    wherein said projector further includes a zoom position detector configured to detect a position of a part of said internal lens element group for determining said focal length according to a rotation angle of said zoom ring.

5. The projector according to claim 1,
    wherein said light source comprises a laser light source, and
    wherein said projector directs a laser light beam from said laser light source to an image modulating device, and magnifies and projects an image formed at said image modulating device through said zoom lens.

6. The projector according to claim 5, wherein a energy density of said laser light beam that appears on the outer surface of said light transmitting window is at or below an Accessible Emission Limit value (AEL value) to satisfy a laser safety class of a projector.

7. A control method for a projector to magnify and project a light beam from a light source through a zoom lens, the method comprising:
    movably disposing a light transmitting window in front of a surface of a light outgoing side of said zoom lens along an optical axis; and
    controlling a position of said light transmitting window so as not to change a region of said light beam that appears on an outer surface of said light transmitting window in accordance with varying a focal length of said zoom lens,
    wherein said light transmitting window is closest to the surface of the light outgoing side of said zoom lens when the focal length of said zoom lens is set to a shortest length, and said light transmitting window is most distant from the surface of the light outgoing side of said zoom lens when the focal length of said zoom lens is set to a longest length.

8. The control method for a projector according to claim 7,
    wherein said light source comprises a laser light source, and
    wherein said projector directs a laser light beam from said laser light source to an image modulating device, and magnifies and projects an image formed at said image modulating device through said zoom lens.

9. The control method for a projector according to claim 8, wherein a energy density of said laser light beam that appears on the outer surface of said light transmitting window is at or below an Accessible Emission Limit value (AEL value) to satisfy a laser safety class of a projector.

* * * * *